(12) United States Patent
Tsukuda et al.

(10) Patent No.: US 12,325,278 B2
(45) Date of Patent: Jun. 10, 2025

(54) VEHICLE AIR-CONDITIONING DEVICE

(71) Applicant: Highly Marelli Japan Corporation, Tokyo (JP)

(72) Inventors: Ryuuji Tsukuda, Tokyo (JP); Hiroshi Kishi, Tokyo (JP); Hiromichi Yanashima, Tokyo (JP); Makoto Aoshika, Tokyo (JP)

(73) Assignee: HIGHLY MARELLI JAPAN CORPORATION, Tokyo (JP)

( * ) Notice: Subject to any disclaimer, the term of this patent is extended or adjusted under 35 U.S.C. 154(b) by 446 days.

(21) Appl. No.: 17/787,259

(22) PCT Filed: Dec. 4, 2020

(86) PCT No.: PCT/JP2020/045204
§ 371 (c)(1),
(2) Date: Jun. 20, 2022

(87) PCT Pub. No.: WO2021/124925
PCT Pub. Date: Jun. 24, 2021

(65) Prior Publication Data
US 2023/0016203 A1    Jan. 19, 2023

(30) Foreign Application Priority Data

Dec. 19, 2019 (JP) ................................. 2019-229493

(51) Int. Cl.
*B60H 1/00* (2006.01)
*B60H 3/06* (2006.01)

(52) U.S. Cl.
CPC ....... *B60H 1/00564* (2013.01); *B60H 3/0608* (2013.01)

(58) Field of Classification Search
CPC .............. B60H 1/00564; B60H 3/0608; B60H 2001/00214; B60H 2001/00228; B60H 2001/00085
See application file for complete search history.

(56) References Cited

U.S. PATENT DOCUMENTS 3,738,088 A * 6/1973 Colosimo ................. B03C 3/32
                                                      55/482
6,135,201 A    10/2000 Nonoyama et al.
(Continued)

FOREIGN PATENT DOCUMENTS

EP       2119582 A1 * 11/2009   ......... B60H 1/00028
JP       59-122910        7/1984
(Continued)

*Primary Examiner* — Jorge A Pereiro
*Assistant Examiner* — Michael James Giordano
(74) *Attorney, Agent, or Firm* — Foley & Lardner LLP (57) ABSTRACT

A vehicle air-conditioning device comprises: a case inside of which a passage for air is formed, the case having an outside-air introducing port and an air discharge port, the outside-air introducing port opening on the vehicle front side and being capable of introducing air from outside a vehicle (the outside air), and the air discharge port being capable of discharging the introduced air to air the front side; a filter portion inside of which the air can pass through, the filter portion being arranged on the upstream side of the air discharge port; and an air blower capable of sucking the air introduced into the passage, the air blower being arranged on the downstream side of the filter portion. The passage is formed to be bent such that the angle θ between an opening face of the outside-air introducing port and an upstream surface of the filter portion is an obtuse angle. The case has a guide portion, the guide portion being configured to rectify a part of the air on the upstream side of the filter portion in
(Continued)

the passage such that the air is directed towards the vehicle front side, and the guide portion being configured to guide the air to the filter portion.

9 Claims, 8 Drawing Sheets

(56) References Cited

U.S. PATENT DOCUMENTS

| | | |
|---|---|---|
| 2010/0009620 A1 | 1/2010 | Kawato et al. |
| 2015/0283877 A1 | 10/2015 | Bailey |
| 2021/0206231 A1 | 7/2021 | Tsukuda et al. |

FOREIGN PATENT DOCUMENTS

| | | |
|---|---|---|
| JP | 02-026913 U | 2/1990 |
| JP | 05-005514 U | 1/1993 |
| JP | 2007-253938 A | 10/2007 |
| JP | 2019-202755 A | 11/2019 |
| WO | WO-2012/115719 A1 | 8/2012 |

\* cited by examiner

| R1 | R2 MIDDLE | R3 MIDDLE |
|---|---|---|
| R4 MIDDLE | R5 MIDDLE | R6 MIDDLE |
| R7 HIGH | R8 MIDDLE | R9 MIDDLE |
| R10 MIDDLE | R11 MIDDLE | R12 MIDDLE |

Figure 7B

| R1 | R2 LOW | R3 LOW |
|---|---|---|
| R4 HIGH | R5 HIGH | R6 HIGH |
| R7 MIDDLE | R8 MIDDLE | R9 MIDDLE |
| R10 MIDDLE | R11 MIDDLE | R12 MIDDLE |

Figure 8

VEHICLE AIR-CONDITIONING DEVICE

TECHNICAL FIELD

The present invention relates to a vehicle air-conditioning device.

BACKGROUND ART

JP2007-253938A discloses a vehicle air-conditioning device (a vehicle HVAC system) including a case having a single outside-air introducing port and two inside-air introducing ports. In the vehicle air-conditioning device disclosed in JP2007-253938A, by partitioning a passage in communication with the outside-air introducing port from a passage in communication with the inside-air introducing ports, an amount of outside air leaking into a vehicle cabin via the inside-air introducing ports is reduced. In addition, as described in the vehicle air-conditioning device disclosed in JP2007-253938A, the opening area is ensured by arranging two inside-air introducing ports.

SUMMARY OF INVENTION

However, in a case in which the vehicle air-conditioning device is to be arranged in a vehicle, a layout-related restriction is caused due to a relationship with components to be arranged in an engine compartment and from the point of view of ensuring a space in a vehicle cabin, and therefore, there may be a case in which the outside-air introducing port that introduces air from outside the vehicle and an air discharge port that discharges thus introduced air are arranged so as to be oriented in the same direction. In this case, a passage in the case is formed so as to be bent, and so, the air that has been introduced into the passage flows towards an air filter after being bent greatly at an acute angle. As a result, when the air introduced into the passage flows towards the air filter, while the air tends to flow so as to converge at the passage outer circumferential side, the air is less likely to flow towards the passage inner circumferential side, and thus, the flow of the air inside the passage tends to be deviated towards the outer circumferential side.

The present invention is made in order to solve the above-described problem, and an object thereof is to correct the deviation of the flow of the air inside the passage described above and to perform air-conditioning with a high efficiency by reducing a passage resistance (a pressure loss).

A vehicle air-conditioning device according to an aspect of the present invention is provided with: a case inside of which a passage for air is formed, the case having an outside-air introducing port, an inside-air introducing port, and an air discharge port, the outside-air introducing port opening on a vehicle front side and being capable of introducing air from outside a vehicle, the inside-air introducing port being capable of introducing air from inside a vehicle cabin, and the air discharge port being capable of discharging the introduced air to an engine compartment side on the vehicle front side, the engine compartment side being on substantially the same side as the outside-air introducing port; a filter portion inside of which the air can pass through, the filter portion being arranged on an upstream side of the air discharge port and on a downstream side of the outside-air introducing port and the inside-air introducing port; and an air blower capable of sucking the air introduced into the passage, the air blower being arranged on a downstream side of the filter portion and on the engine compartment side on the vehicle front side, wherein the passage is formed to be bent such that an angle between an opening face of the outside-air introducing port and an upstream surface of the filter portion is an obtuse angle, and the case has a guide portion, the guide portion being configured to rectify a part of the air on the upstream side of the filter portion in the passage such that the air is directed towards the vehicle front side, and the guide portion being configured to guide the air to the filter portion.

With the vehicle air-conditioning device according to an aspect of the present invention, since the part of the air on the upstream side of the filter portion is rectified by the guide portion so as to be directed towards the vehicle front side, the air is guided to the filter portion with ease. Therefore, the deviation of the flow of the air in the passage can be corrected by the guide portion, and thus, it is possible to perform the air-conditioning with a high efficiency by reducing the passage resistance.

DESCRIPTION OF EMBODIMENTS

Embodiments of the present invention will be described below with reference to the drawings.

A configuration of an air-conditioning device 100 (a vehicle air-conditioning device) that is provided in a vehicle 1 to adjust temperature inside a vehicle cabin 3 will be described first with reference to FIG. 1.

Figure 1:
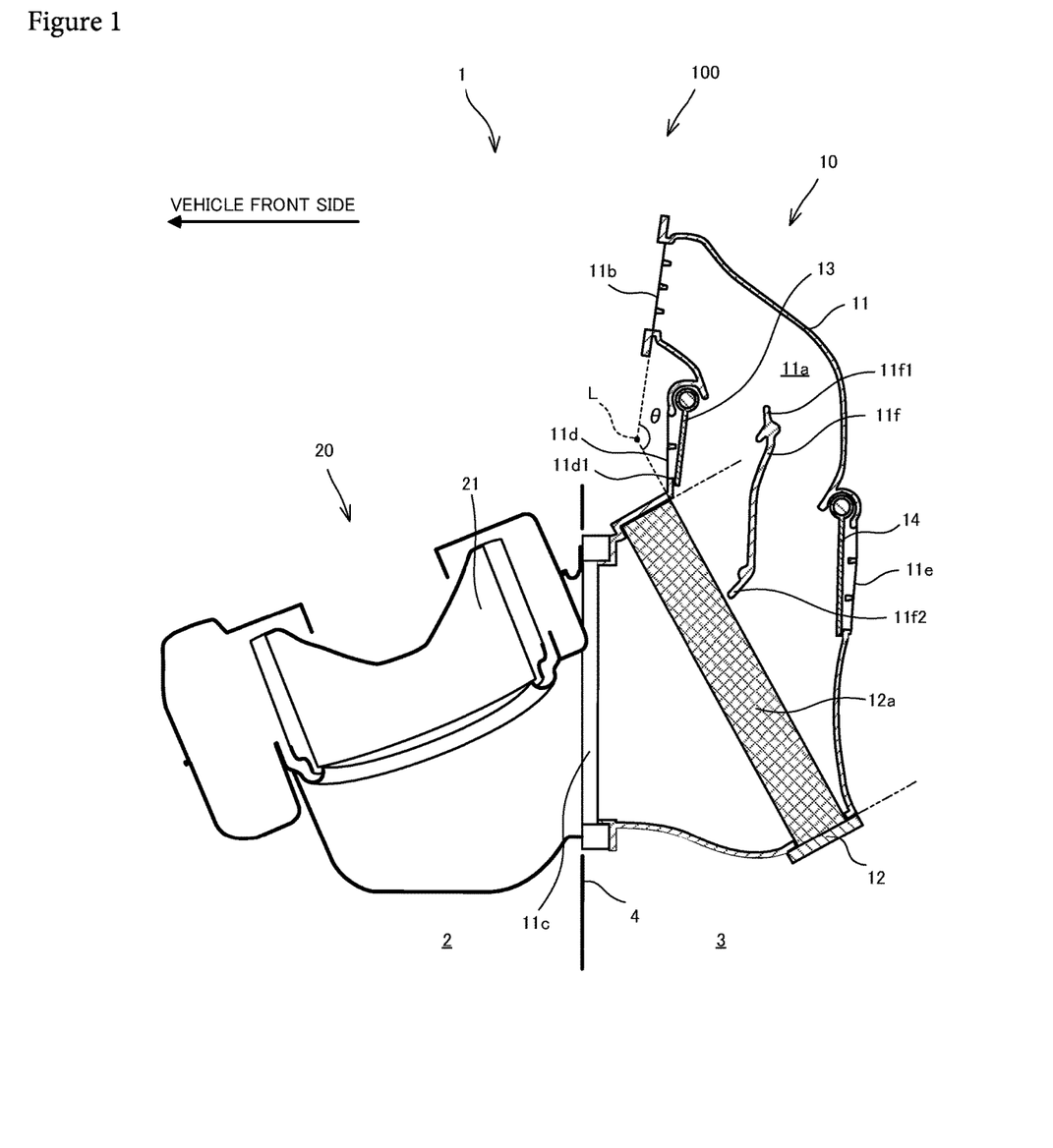
FIG. 1 is a longitudinal sectional view showing a schematic configuration of a vicinity of an inside-outside-air switching device of a vehicle air-conditioning device according to an embodiment of the present invention.

FIG. 1 is a longitudinal sectional view showing a schematic configuration of a vicinity of an inside-outside-air switching device 10 of the air-conditioning device 100 according to an embodiment of the present invention.

In a front part of the vehicle 1, an engine compartment 2 that accommodates an engine, etc. (not shown) is provided, and the vehicle cabin 3 is provided on the rear side of the engine compartment 2. The engine compartment 2 and the vehicle cabin 3 are partitioned by a partition wall 4 such as a dash panel, etc. In a case of an electric vehicle, a driving motor etc. is accommodated in the engine compartment 2.

The air-conditioning device 100 is provided with the inside-outside-air switching device 10, an air blower 20 (a blower), and an air-conditioning device main body (not shown).

In a general vehicle air-conditioning device, the inside-outside-air switching device 10, the air blower 20, and the air-conditioning device main body are integrally arranged in the front part in the vehicle cabin 3, in other words, on the rear side of the partition wall 4, and are covered by an instrument panel (not shown) so as not be visible from a crew.

Therefore, in the general vehicle air-conditioning device, the general vehicle air-conditioning device is located entirely in the front part in the vehicle cabin 3, and so, a space in the vehicle cabin 3 tends to be reduced correspondingly.

In contrast, in the air-conditioning device 100 according to the embodiment of the present invention, the air blower 20 and the air-conditioning device main body are arranged in the engine compartment 2, and the inside-outside-air switching device 10 is arranged in the vehicle cabin 3.

Therefore, in the air-conditioning device 100, because only the inside-outside-air switching device 10 is located in the front part in the vehicle cabin 3, the space can be ensured in the vehicle cabin 3 with ease.

The air blower 20 sucks the air for the air-conditioning to the inside of the air-conditioning device 100 by rotating a fan 21. Thus-sucked air is sent from the air blower 20 to the air-conditioning device main body. A cylindrical sirocco fan is used as the fan 21, for example.

An evaporator, a heater core, and so forth for adjusting the temperature of the air sent from the air blower 20 are arranged inside the air-conditioning device main body. The air the temperature of which has been adjusted is blown out from the air-conditioning device main body towards the vehicle cabin 3. Humidity of the air that is to be blown out towards the vehicle cabin 3 may also be adjusted in addition to the temperature thereof.

The inside-outside-air switching device 10 has a case 11, a filter portion 12, a first inside-air introducing door 13, and a second inside-air introducing door 14.

The case 11 is formed to have a cylindrical or barrel shape, and a passage 11a for the air is formed inside thereof. In addition, the case 11 is formed with an outside-air introducing port 11b and an air discharge port 11c.

The outside-air introducing port 11b is an opening through which the air outside the vehicle 1 (the outside air) can be introduced into the passage 11a in the case 11. The outside-air introducing port 11b is located at the front side of the case 11 and opens at the engine compartment 2 side, in other words, at the vehicle front side. As described above, because the outside-air introducing port 11b opens at the vehicle front side, it becomes easier for the air to flow towards the outside-air introducing port 11b when the vehicle 1 is travelling, and it is possible to improve efficiency for the introduction of the air.

The air discharge port 11c is an opening through which the air that has been introduced to the passage 11a in the case 11 can be discharged towards the side of the engine compartment 2 on the front side. The air introduced from the outside-air introducing port 11b is sucked into the fan 21 through inside a case of the air blower 20 that is arranged in the engine compartment 2. Because of a layout-related restriction for achieving connection with the air blower 20 that is arranged on the front side, the air discharge port 11c is, similarly to the outside-air introducing port 11b, also located on the front side of the case 11 and opens at the vehicle front side, that is substantially the same side as the outside-air introducing port 11b. As described above, in the air-conditioning device 100, in order to decide the layout of the air discharge port 11c to be formed in the case 11, relationships with respect to the positions of and the connections with the air blower 20 and the air-conditioning device main body in the engine compartment 2 are taken into consideration.

The passage 11a is formed to be bent such that the angle θ between an opening face of the outside-air introducing port 11b and an upstream surface of the filter portion 12 becomes the obtuse angle (θ>90°).

In the case 11, a passage portion of the passage 11a from the outside-air introducing port 11b to the filter portion 12 is bent such that the radius of curvature becomes particularly small, and so, the flow direction of the air flowing the inside thereof is changed abruptly at the passage portion. In other words, the upstream surface of the filter portion 12, which is an end point of the passage portion, is located at the position that is rotated by 90 degrees or more from the opening face of the outside-air introducing port 11b, which is a starting point of the passage portion, along the flow of the air. In the above, an intersecting line L (shown as a dot in FIG. 1) at which the imaginary plane extending along the opening face of the outside-air introducing port 11b and the imaginary plane extending along the upstream surface of the filter portion 12, which are shown by broken lines in FIG. 1, intersect with each other serves as the center of rotation.

Because the filter portion 12 is arranged so as to be inclined with respect to the case 11, the intersecting line L is located towards the vehicle front side relative to the center of the case 11. Therefore, in the passage 11a, especially in the passage portion from the outside-air introducing port 11b to the filter portion 12, the vehicle front side of the passage 11a serves as an inner circumferential surface, and the vehicle rear side thereof serves as an outer circumferential surface. In addition, because the angle θ is the obtuse angle, as well as the intersecting line L is located towards the vehicle front side relative to the center of the case 11, the upstream surface of the filter portion 12 faces the vehicle rear side and a downstream surface faces the vehicle front side.

In addition, the case 11 is formed with a first inside-air introducing port 11d, a second inside-air introducing port 11e, and a guide portion 11f.

The first inside-air introducing port 11d and the second inside-air introducing port 11e are openings through which the air can be introduced from the vehicle cabin 3 and are provided between the outside-air introducing port 11b of the passage 11a and the filter portion 12.

The first inside-air introducing port 11d opens at the vehicle front side relative to the guide portion 11f. As shown in FIG. 1, the first inside-air introducing port 11d opens at the inner circumferential surface of the passage 11a so as to face the vehicle front side.

In addition, the first inside-air introducing port 11*d* is arranged at outside of a position where the upstream surface of the filter portion 12 faces, in other words, the first inside-air introducing port 11*d* is arranged at an outside region of a perpendicular surface region that extends perpendicularly from the upstream surface of the filter portion 12. The perpendicular surface region is defined as the region extended perpendicularly from the surface of the filter portion 12 to the upstream side and is, for example, the region between two two-dot broken lines as shown in FIG. 1. Therefore, similarly to the flow of the air introduced from the outside-air introducing port 11*b*, the flow direction of the air introduced from the first inside-air introducing port 11*d* is also changed abruptly inside the passage 11*a*.

The second inside-air introducing port 11*e* opens at the vehicle rear side relative to the guide portion 11*f*. As shown in FIG. 1, the second inside-air introducing port 11*e* opens at the outer circumferential surface of the passage 11*a* so as to face the vehicle rear side.

The guide portion 11*f* is a plate member that rectifies a part of the air in the passage 11*a* on the upstream side of the filter portion 12 that the air is directed towards the vehicle front side and that the air is guided to the filter portion 12. The guide portion 11*f* is arranged in the vicinity of the center of the passage 11*a* of the case 11 so as to extend in the longitudinal direction of the case 11, in other words, the flowing direction of the air. The guide portion 11*f* functions as a partition that partitions the passage 11*a* into a passage on the inner circumferential side and a passage on the outer circumferential side. Thus, the air that has been introduced from the outside-air introducing port 11*b* to the passage 11*a* is guided to the filter portion 12 by being divided by the guide portion 11*f* into the air flowing through the passage on the inner circumferential side of the passage 11*a* and the air flowing through the passage on the outer circumferential side thereof.

Similarly, the guide portion 11*f* can also guide the air introduced into the passage 11*a* from the first inside-air introducing port 11*d* and the second inside-air introducing port 11*e* to the filter portion 12.

In addition, the guide portion 11*f* has an upstream-side end portion 11*f*1 that is located on the upstream side and a downstream-side end portion 11*f*2 that is located on the downstream side.

The upstream-side end portion 11*f*1 is located on the upstream side of an opening lower end 11*d*1 of the first inside-air introducing port 11*d*, in other words, on the outside-air introducing port 11*b* side. Therefore, the air that has been introduced from the first inside-air introducing port 11*d* can be guided by the guide portion 11*f* towards the inner circumferential side of the passage 11*a* more easily.

The downstream-side end portion 11*f*2 is in close proximity to the upstream surface of the filter portion 12. Therefore, the air that has been divided by the guide portion 11*f* into the passage on the inner circumferential side and the passage on the outer circumferential side of the passage 11*a* flows towards the filter portion 12 without being joined with each other or being reversed to the passage on the other side. As shown in FIG. 1, although the downstream-side end portion 11*f*2 is located in close proximity to the upstream surface of the filter portion 12, the downstream-side end portion 11*f*2 may be brought into contact with the upstream surface of the filter portion 12.

Next, the filter portion 12 of the inside-outside-air switching device 10 will be described.

The filter portion 12 is arranged on the upstream side of the air discharge port 11*c* so as to face the air discharge port 11*c* such that a passage resistance (a pressure loss) is reduced. In addition, as shown in FIG. 1, the filter portion 12 is arranged so as to be inclined such that an area of a portion through which the air can effectively pass is increased, in other words, the effective area is increased, in the passage 11*a*.

The filter portion 12 has an air filter 12*a* through the inside of which the air can pass. The passage resistance of the filter portion 12 can be reduced by increasing the effective area to reduce an amount of the air passing through per unit area, and this effective area is essentially defined by the area of the air filter 12*a*.

The air filter 12*a* cleans the air to be sent into the vehicle cabin 3 by capturing fine particles in the air such as dusts, pollens, and so forth. The air filter 12*a* may purify the air to be sent into the vehicle cabin 3 by adsorbing and decomposing malodorous components, molds, and so forth in the air by the air filter 12*a*.

In addition, the air filter 12*a* is held by a frame body of the filter portion 12 and is arranged such that the surface thereof extends in the direction in which the air flowing in the passage 11*a* is interrupted. The air filter 12*a* can be exchanged by being removed from a side part of the filter portion 12 on the vehicle cabin 3 side, and as the air filter 12*a* is inserted into the frame body of the filter portion 12, the air filter 12*a* is brought into contact with an inner wall of the case 11 forming the inner circumferential side of the passage 11*a* to interrupt the air. Therefore, the air flowing in the passage 11*a* flows to the air discharge port 11*c* after passing through the air filter 12*a*, and so, it is possible to clean the air to be sent into the vehicle cabin 3.

Subsequently, the first inside-air introducing door 13 and the second inside-air introducing door 14 of the inside-outside-air switching device 10 will be described with reference to FIG. 2.

Figure 2:
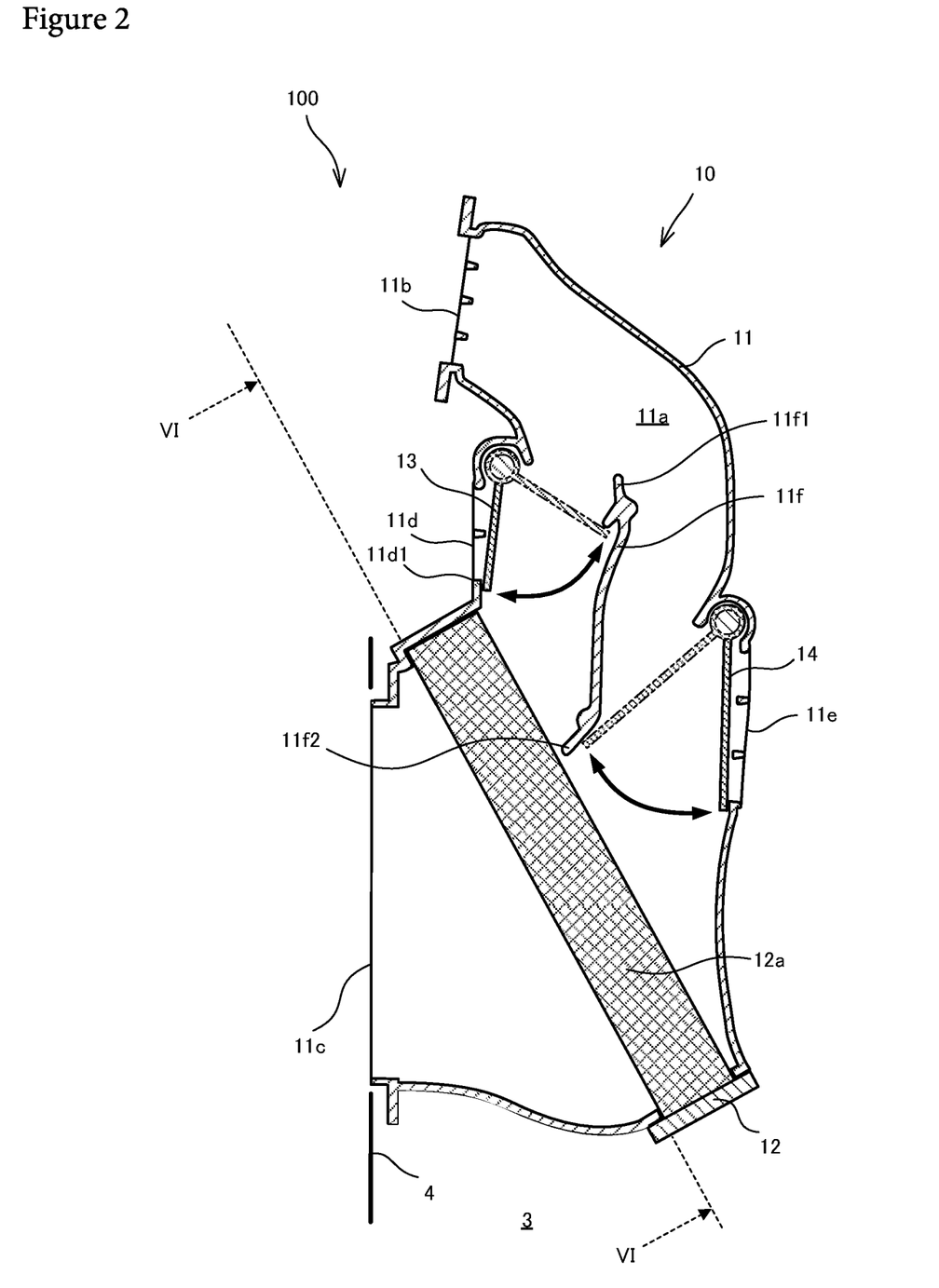
FIG. 2 is a longitudinal sectional view showing opening/closing embodiments of a first inside-air introducing door and a second inside-air introducing door of the vehicle air-conditioning device according to the embodiment of the present invention.

FIG. 2 is a longitudinal sectional view showing opening/closing embodiments of the first inside-air introducing door 13 and the second inside-air introducing door 14 of the air-conditioning device 100.

The first inside-air introducing door 13 is an opening/closing type flap door that is capable of blocking the air introduced from the first inside-air introducing port 11*d* into the passage 11*a* and is provided on the vehicle front side of the passage 11*a* such that its upstream side is pivotably supported.

In a case in which the first inside-air introducing door 13 is positioned at a close position at which the first inside-air introducing port 11*d* is closed as shown with the solid line in FIG. 2, the air introduced from the first inside-air introducing port 11*d* can be blocked. In the case in which the first inside-air introducing door 13 is positioned at the close position, a door tip end of the first inside-air introducing door 13 comes into close proximity to the inner wall of the case 11 in the vicinity of the opening lower end 11*d*1 of the first inside-air introducing port 11*d*. The door tip end of the first inside-air introducing door 13 may be brought into contact with the inner wall of the case 11 such that the air introduced from the first inside-air introducing port 11*d* is blocked more easily.

On the other hand, in a case in which the first inside-air introducing door 13 is opened from the position at which the first inside-air introducing port 11*d* is closed as shown with the solid line in FIG. 2 and the first inside-air introducing door 13 is positioned between this position and an open position at which the first inside-air introducing port 11*d* as shown with the two-dot broken line in FIG. 2, it is possible to introduce the air from the vehicle cabin 3 into the passage 11a via the first inside-air introducing port 11d. The door tip end may be brought into contact with the upstream-side end portion 11f1 of the guide portion 11f.

The second inside-air introducing door 14 is the opening/closing type flap door that is capable of blocking the air introduced from the second inside-air introducing port 11e into the passage 11a and is provided on the vehicle rear side of the passage 11a such that its upstream side is pivotably supported.

In a case in which the second inside-air introducing door 14 is positioned at the close position at which the second inside-air introducing port 11e is closed as shown with the solid line in FIG. 2, the air introduced from the second inside-air introducing port 11e can be blocked. In the case in which the second inside-air introducing door 14 is positioned at the close position, a door tip end of the second inside-air introducing door 14 comes into close proximity to the inner wall of the case 11 in the vicinity of the opening lower end of the second inside-air introducing port 11e. The door tip end of the second inside-air introducing door 14 may be brought into contact with the inner wall of the case 11 such that the air introduced from the second inside-air introducing port 11e is blocked more easily.

On the other hand, in a case in which the second inside-air introducing door 14 is positioned between the position at which the second inside-air introducing port 11e is closed as shown with the solid line in FIG. 2 and the open position at which the second inside-air introducing port 11e is opened as shown with the two-dot broken line in FIG. 2, it is possible to introduce the air from the inside the vehicle cabin 3 into the passage 11a via the second inside-air introducing port 11e. The door tip end may be brought into contact with the downstream-side end portion 11f2 of the guide portion 11f.

Next, respective air-conditioning modes of the air-conditioning device 100 will be described with reference to FIGS. 3 to 5. The respective air-conditioning modes are selected by a controller (not shown) that is provided in the air-conditioning device 100 in accordance with operational requests from a driver, etc. in the vehicle cabin 3. As described above, the controller of the air-conditioning device 100 functions as an air-conditioning control unit (air-conditioning control means).

Figure 3:
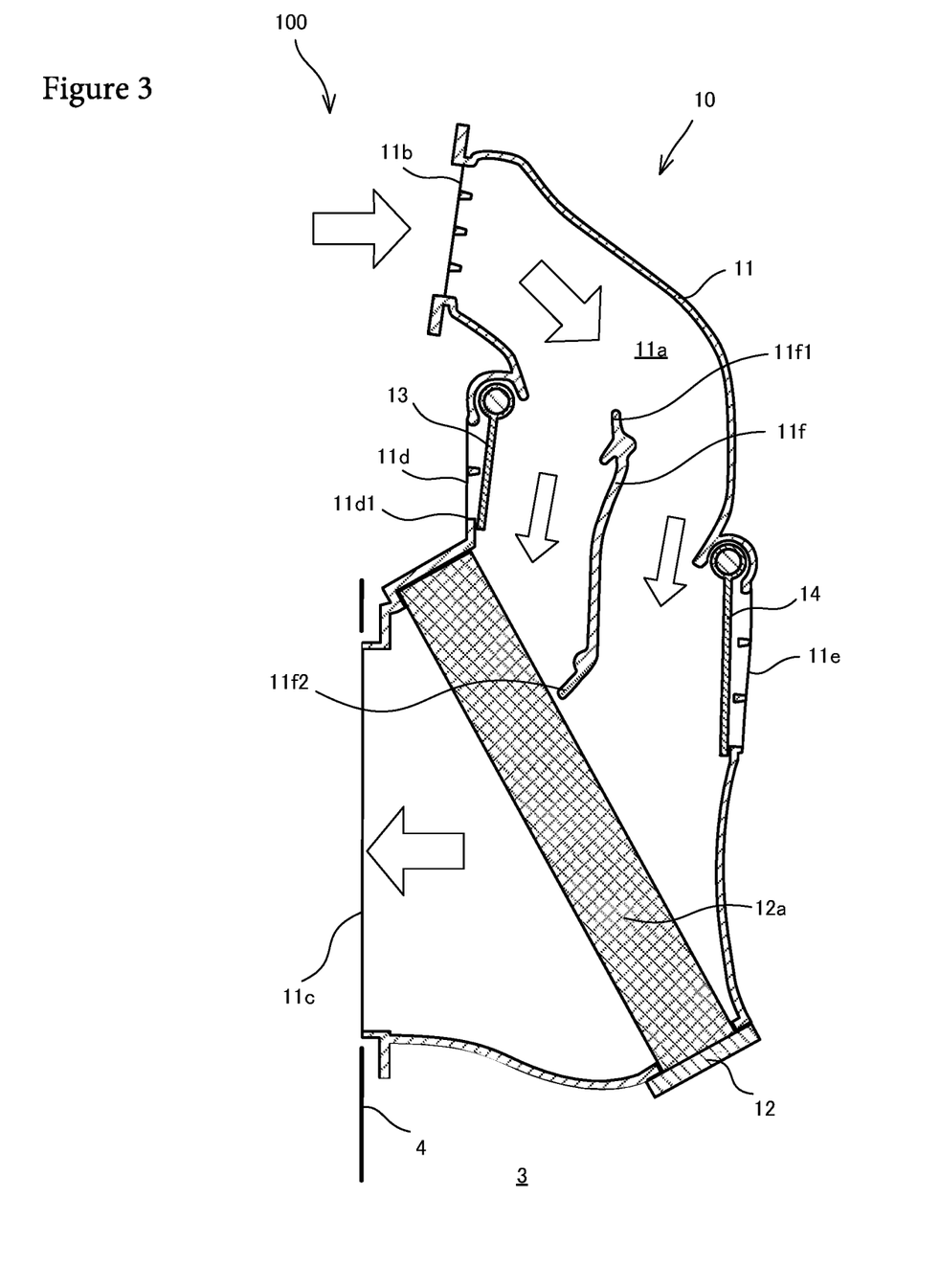
FIG. 3 is a longitudinal sectional view showing flow of air inside a passage when the vehicle air-conditioning device according to the embodiment of the present invention is in an outside-air introducing mode.

FIG. 3 is a longitudinal sectional view showing the flow of the air in the passage 11a when the air-conditioning device 100 is in an outside-air introducing mode. FIG. 4 is a longitudinal sectional view showing the flow of the air in the passage 11a when the air-conditioning device 100 is in an inside-air circulating mode. FIG. 5 is a longitudinal sectional view showing the flow of the air in the passage 11a when the air-conditioning device 100 is in a partial re-circulating mode.

<Outside-Air Introducing Mode>

The outside-air introducing mode is a mode in which the air outside the vehicle 1 (the outside air) is introduced into the passage 11a, and when the outside-air introducing mode is selected, the air flows through the passage 11a as shown with arrows in FIG. 3.

When the outside-air introducing mode is selected, the first inside-air introducing door 13 is positioned at the close position such that the passage of the air introduced from the first inside-air introducing port 11d through the passage 11a is blocked. In addition, similarly, the second inside-air introducing door 14 is also positioned at the close position such that the passage of the air introduced from the second inside-air introducing port 11e through the passage 11a is blocked. Therefore, the air introduced from the outside-air introducing port 11b passes through the inside of the passage 11a and flows towards the air discharge port 11c.

<Inside-Air Circulating Mode>

Figure 4:
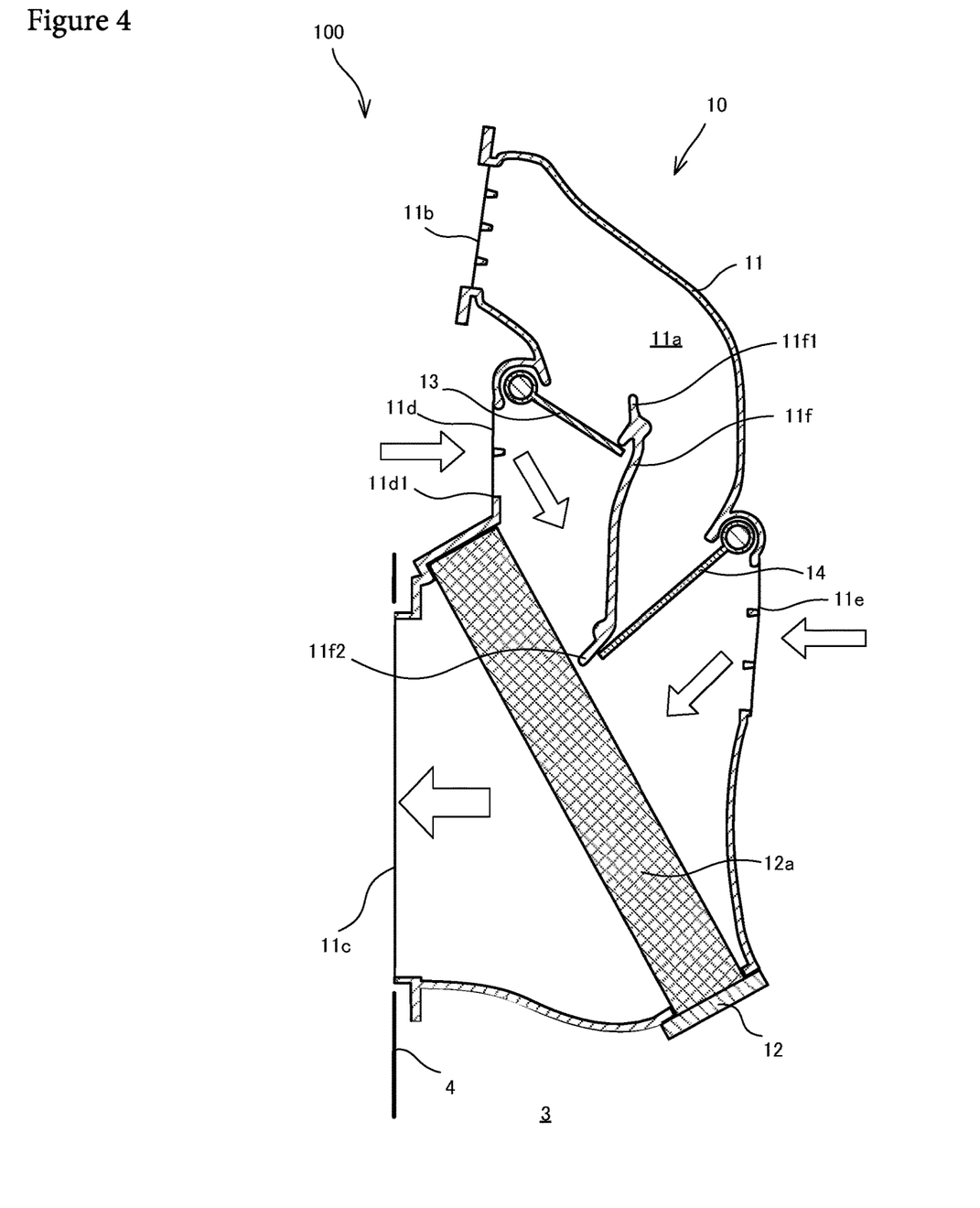
FIG. 4 is a longitudinal sectional view showing the flow of the air in the passage when the vehicle air-conditioning device according to the embodiment of the present invention is in an inside-air circulating mode.

The inside-air circulating mode is a mode in which the air in the vehicle cabin 3 is introduced into the passage 11a, and when the inside-air circulating mode is selected, the air flows through the passage 11a as shown with arrows in FIG. 4.

When the inside-air circulating mode is selected, the first inside-air introducing door 13 and the second inside-air introducing door 14 are positioned at the open positions such that the passage of the air introduced from the outside-air introducing port 11b through the passage 11a is blocked. As the first inside-air introducing door 13 and the second inside-air introducing door 14 positioned at the close positions are brought into contact with the upstream-side end portion 11f1 and the downstream-side end portion 11f2 of the guide portion 11f, respectively, as shown in FIG. 4, it is possible to close the passage 11a without forming a gap, and so, it is possible to block the passage of the air introduced from the outside-air introducing port 11b through the passage 11a more easily.

<Partial Re-Circulating Mode>

Figure 5:
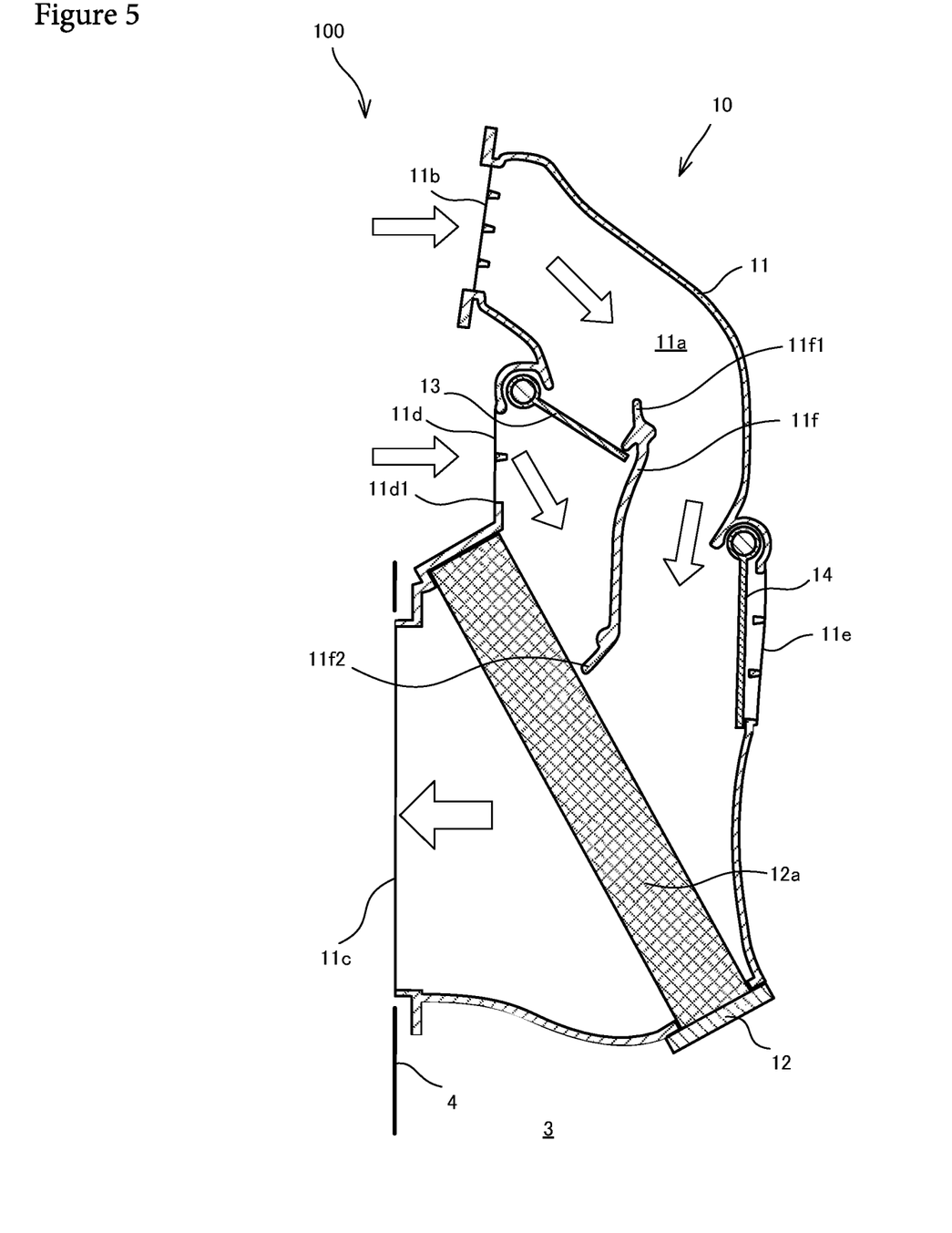
FIG. 5 is a longitudinal sectional view showing the flow of the air in the passage when the vehicle air-conditioning device according to the embodiment of the present invention is in a partial re-circulating mode.

The partial re-circulating mode is a mode in which both of the air outside the vehicle 1 and the air inside the vehicle cabin 3 are introduced into the passage 11a, and when the partial re-circulating mode is selected, the air flows through the passage 11a as shown with arrows in FIG. 5.

When the partial re-circulating mode is selected, the first inside-air introducing door 13 is positioned at the open position such that the passage of the air introduced from the outside-air introducing port 11b through the passage 11a is restricted or blocked. On the other hand, the second inside-air introducing door 14 is positioned at the close position such that the passage of the air introduced from the second inside-air introducing port 11e through the passage 11a is blocked.

Accordingly, while taking in fresh outside air, it is possible to mix the fresh outside air with a part of the air in the vehicle cabin 3, temperature of which has been adjusted, at an arbitrary ratio and to re-circulate the mixed air. Therefore, it is possible to perform the air-conditioning, in which the fresh air is taken in, without increasing a load even when a temperature difference between the outside temperature and the temperature in the vehicle cabin 3 is large.

In addition, the air in the vehicle cabin 3 is taken in from the inner circumferential side of the passage 11a, in other words, the vehicle front side that is away from the vehicle cabin 3 via the first inside-air introducing port 11d. Similarly, the air outside the vehicle 1 is taken in from the vehicle front side that is away from the vehicle cabin 3 via the outside-air introducing port 11b. Therefore, because the air is taken in from the position in distant from the vehicle cabin 3, when the air is taken in, the transmission of the noise to the vehicle cabin 3 can be suppressed. Therefore, it is possible to keep the silent environment in the vehicle cabin 3 at a high level.

In addition, because the downstream-side end portion 11f2 of the guide portion 11f is in close proximity to the upstream surface of the filter portion 12, it is possible to prevent a reverse flow to the first inside-air introducing port 11d of the air that has been introduced from the outside-air introducing port 11b. Accordingly, the outside air that has not been subjected to the air-conditioning does not flow into the vehicle cabin 3. Therefore, it is possible to suitably perform the air-conditioning with the partial re-circulating mode in which both of the air outside the vehicle 1 and the air in the vehicle cabin 3 are sent.

In the partial re-circulating mode, the open/close positions of the first inside-air introducing door 13 and the second inside-air introducing door 14 may be inversed. In other words, the first inside-air introducing door 13 may be positioned at the close position to allow the air outside the vehicle 1 to flow towards the inner circumferential side of the passage 11*a*, and the second inside-air introducing door 14 may be positioned at the open position to take in the air in the vehicle cabin 3 from the outer circumferential side of the passage 11*a*.

Next, a flow distribution of the air passing through the filter portion 12 of the air-conditioning device 100 will be described with reference to FIGS. 6 to 7B.

Figure 6:
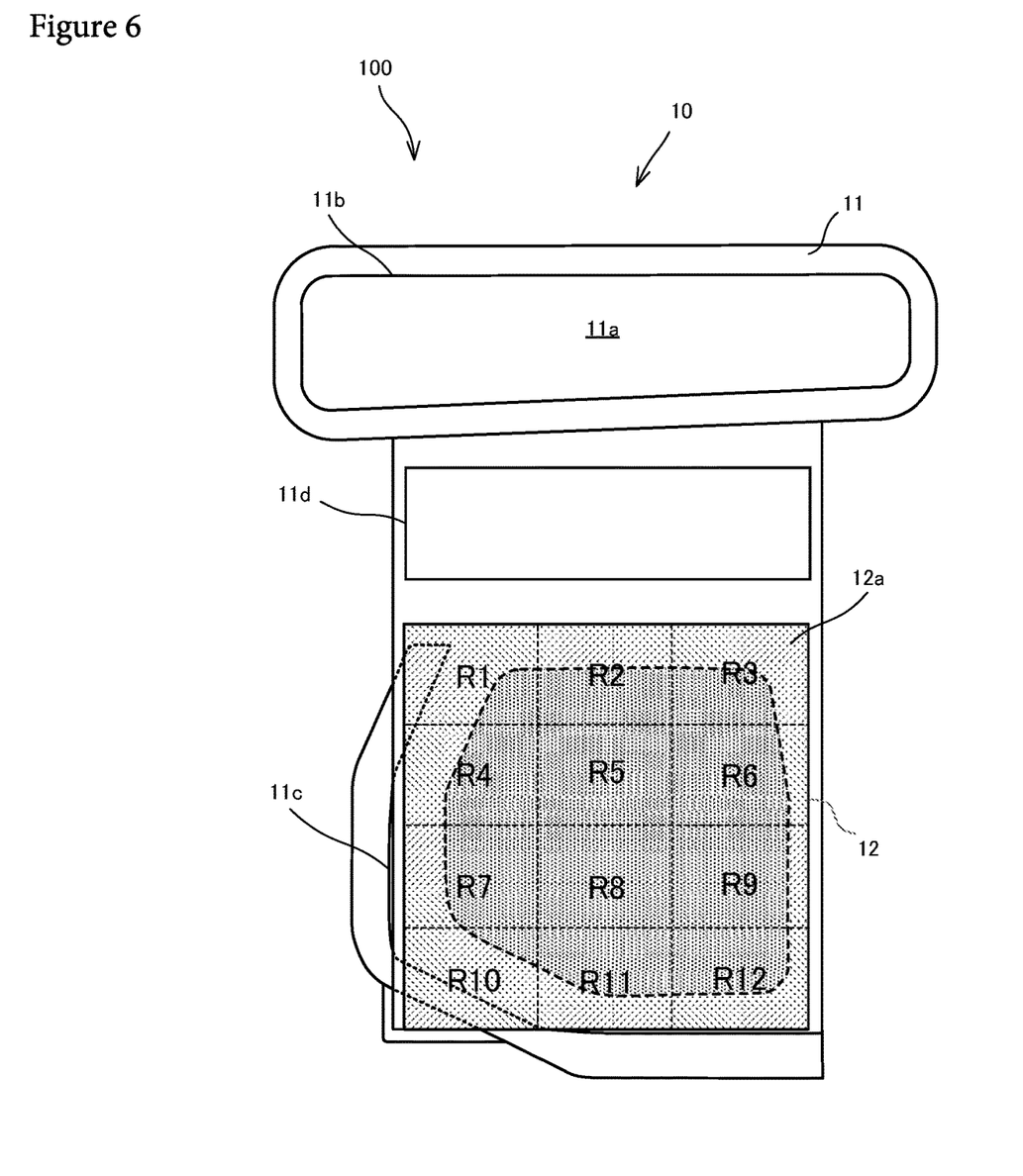
FIG. 6 is a sectional view showing a flow distribution of the air passing through a filter portion of the vehicle air-conditioning device according to the embodiment of the present invention and is a sectional view taken along a line VI-VI in FIG. 2.

FIG. 6 is a sectional view showing the flow distribution of the air passing through the filter portion 12 of the air-conditioning device 100 and is a sectional view taken along line VI-VI in FIG. 2.

The air at the downstream surface of the filter portion 12 flows along the case 11 and the filter portion 12 as shown in the flow distribution expressed with a grayscale in FIG. 6. In FIG. 6, dark gray portions show that the air flow rate is relatively high, and light gray portions show that the air flow rate is relatively low.

In the vicinity of an edge of the filter portion 12, resistance is caused due to influences of the shapes of the case 11 and the filter portion 12, and the air flow rate is reduced in a relative manner. On the other hand, at other part than the vicinity of the edge of the filter portion 12, the influences of the shapes of the case 11 and the filter portion 12 is diminished, and the air flow rate is increased in a relative manner.

In the below, the difference between the flow distributions of the air at the downstream surface of the filter portion 12 in a case in which the guide portion 11*f* is provided and in a case in which the guide portion 11*f* is not provided will be described.

As shown in FIG. 6, the downstream surface of the filter portion 12 was equally divided into twelve regions R1 to R12 with three columns and four rows, and evaluations of the flow distribution of the air at the respectively regions were performed. For example, the regions R1 to R3 are the regions corresponding to the inner circumferential side of the passage 11*a*, and the regions R10 to R12 are regions corresponding to the outer circumferential side of the passage 11*a*.

Figure 7A:
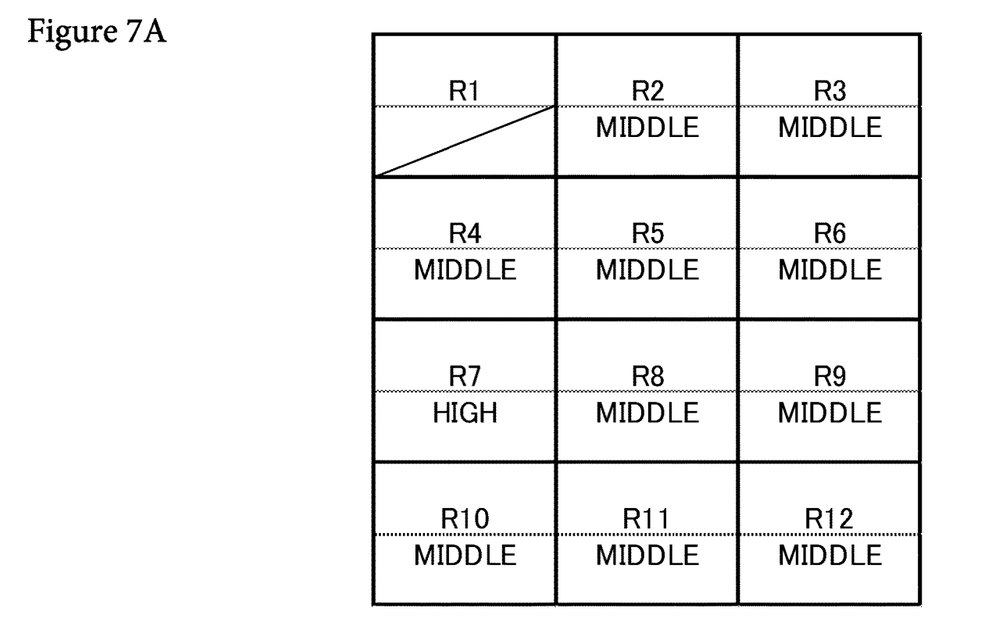
FIG. 7A is a diagram showing the flow distribution of the air passing through the filter portion of the vehicle air-conditioning device according to the embodiment of the present invention with a guide portion.

FIG. 7A is a diagram showing the flow distribution of the air passing through the filter portion 12 of the air-conditioning device 100 according to the embodiment of the present invention provided with the guide portion 11*f*. FIG. 7B is a diagram showing the flow distribution of the air passing through the filter portion of the vehicle air-conditioning device (the air-conditioning device) according to a comparative example of the present invention without a guide portion. At the respective parts corresponding to the regions R1 to R12 shown in FIG. 6, values of "low" to "high" are indicated as the flow rates. The region R1 is the region that is not subjected to the measurement.

In the air-conditioning device 100, the case 11 is formed with the guide portion 11*f* as described above. On the other hand, in the air-conditioning device according to the comparative example, the case without a guide portion is used.

Figure 7B:
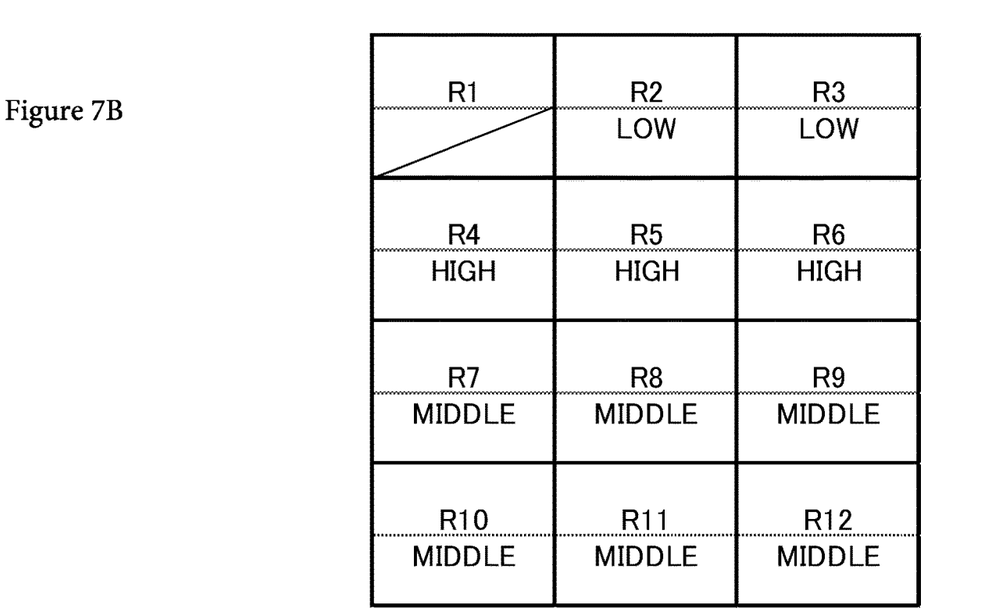
FIG. 7B is a diagram showing the flow distribution of the air passing through the filter portion of the vehicle air-conditioning device according to a comparative example of the present invention without the guide portion.

As shown in FIG. 7B, in the air-conditioning device according to the comparative example without the guide portion, the respective air flow rates at the regions R2 and R3 on the inner circumferential side of the passage are expressed as "low". This is because an inertial force is applied to the air that has entered the passage from the outside-air introducing port facing the vehicle front side. The flow direction of the air that has entered the passage is changed downwards after hitting the outer circumferential surface of the case, and thus, in the filter portion, the respective air flow rates at the regions R2 and R3 corresponding to the inner circumferential side of the passage tend to be lowered. In addition, the air flow rates at the regions R4 to R6 corresponding to the outside of the regions R2 and R3 are increased by an amount corresponding to reduced air flow rates at the regions R2 and R3. Thus, with the air-conditioning device according to the comparative example, the air flow is deviated, and the noise is more likely to be caused.

In contrast, as shown in FIG. 7A, with the air-conditioning device 100 according to the embodiment of the present invention provided with the guide portion 11*f*, all of the air flow rates at the regions R2 to R12 are shown as "middle" or higher, and no region is shown as "low". In addition, with the air-conditioning device 100 according to the embodiment of the present invention, the region at which the air flow rate is shown as "high" is the region R7 only and the number of such regions is smaller compared with the regions with "high" air flow rate in the comparative example (the regions R4 to R6). As described above, with the air-conditioning device 100 according to the embodiment of the present invention, because the part of the air that has entered the passage 11*a* from the outside-air introducing port 11*b* can be guided to the inner circumferential side of the passage 11*a* by the guide portion 11*f*, it is possible to reduce the deviation of the flow of the air inside the passage 11*a* and to suppress the noise. In addition, because the air is allowed to flow through the air filter 12*a* of the filter portion 12 uniformly, it is possible to clean the air with ease by using the whole surface of the air filter 12*a* to extend a period of a replacement cycle of the filter, and at the same time, it is possible to perform the air-conditioning with a high efficiency by reducing the passage resistance.

Figure 8:
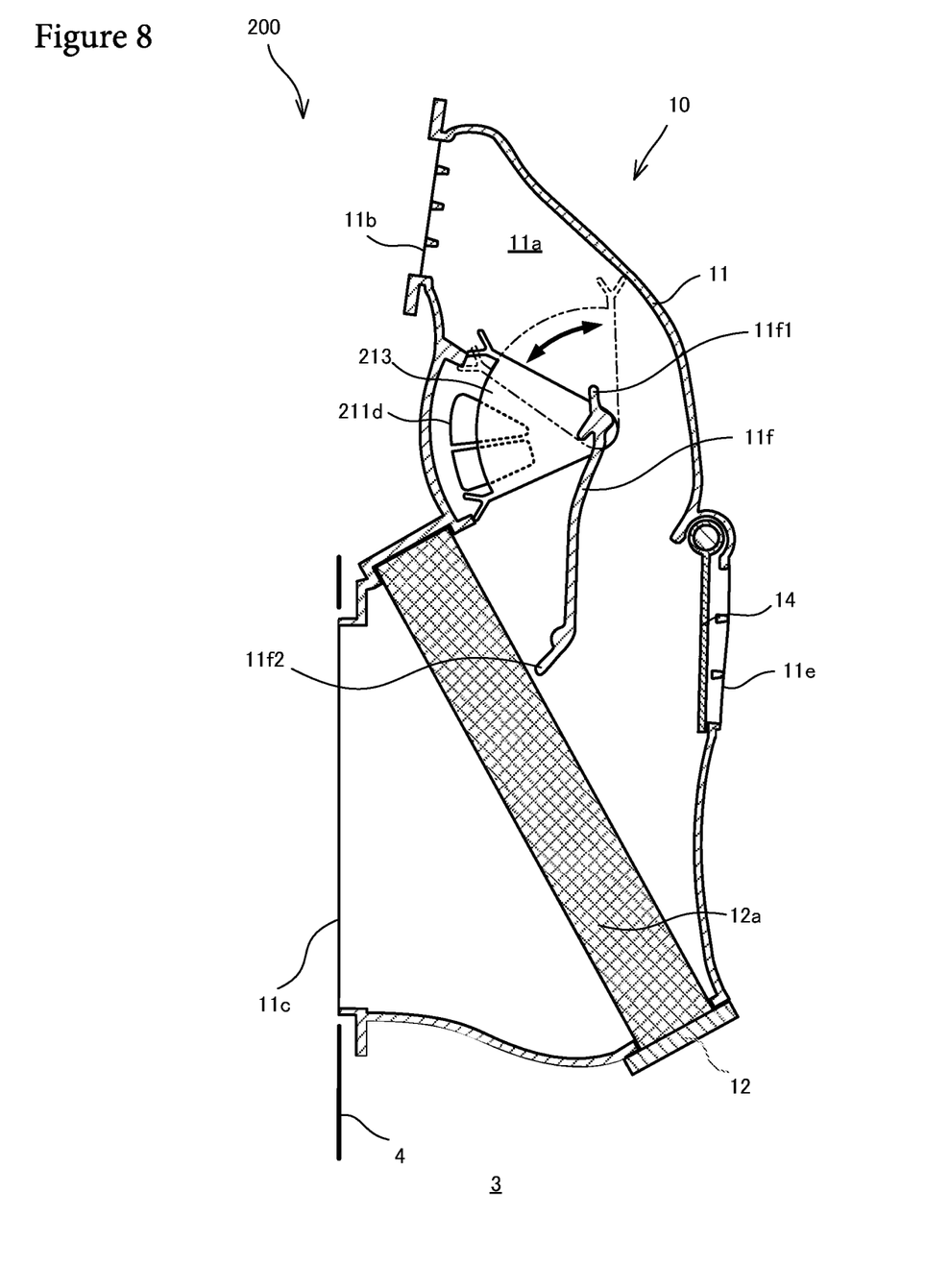
FIG. 8 is a longitudinal sectional view showing the opening/closing embodiments of the first inside-air introducing door of the vehicle air-conditioning device according to a modification of the present invention.

In the air-conditioning device 100, although the first inside-air introducing door 13 is the opening/closing type flap door, as shown in FIG. 8, a rotating-type rotary door may be used as a first inside-air introducing door 213, for example.

FIG. 8 is a longitudinal sectional view showing the opening/closing embodiments of the first inside-air introducing door 213 of an air-conditioning device 200 (the vehicle air-conditioning device) according to a modification of the present invention.

As shown in FIG. 8, the first inside-air introducing door 213 is provided so as to be rotatable by being pivotably supported by the upstream-side end portion 11*f*1 of the guide portion 11*f*.

In addition, on the side surface of the case 11, a first inside-air introducing port 211*d* for introducing the air from inside the vehicle cabin 3 is provided.

When the first inside-air introducing door 213 is positioned at the close position at which the passage 11*a* in the vicinity of the first inside-air introducing port 211*d* is surrounded, the passage of the air from the first inside-air introducing port 211*d* towards the passage 11*a* on the outer side of the first inside-air introducing door 213 is blocked. On the other hand, the air introduced from the outside-air introducing port 11*b* can flow in the passage 11*a* without being blocked by the first inside-air introducing door 213.

In addition, when the first inside-air introducing door 213 is positioned at the open position side at which the passage 11a on the outside-air introducing port 11b side is surrounded, the passage of the air from the outside-air introducing port 11b towards the passage 11a on the outer side of the first inside-air introducing door 213 is restricted or blocked. On the other hand, the air introduced from the first inside-air introducing port 211d can flow in the passage 11a through an opening portion of the first inside-air introducing door 213.

As described above, even if the rotating-type rotary door is used as the first inside-air introducing door 213, it is possible to switch the flow of the air in the passage 11a.

In addition, the rotating-type rotary door may be used as not only the first inside-air introducing door 213, but also as the second inside-air introducing door 14. As described above, even if the rotating-type rotary door is used as the second inside-air introducing door 14, it is possible to switch the flow of the air in the passage 11a in a similar manner.

With the air-conditioning device 100 according to the above-described embodiment, following effects can be achieved.

The air-conditioning device 100 (the vehicle air-conditioning device) is provided with: the case 11 inside of which the passage 11a for the air is formed, the case 11 having the outside-air introducing port 11b and the air discharge port 11c, the outside-air introducing port 11b opening on the vehicle front side and being capable of introducing the air from outside the vehicle 1 (the outside air), and the air discharge port 11c being capable of discharging the introduced air to the front side; the filter portion 12 inside of which the air can pass through, the filter portion 12 being arranged on the upstream side of the air discharge port 11c; and the air blower 20 capable of sucking the air introduced into the passage 11a, the air blower 20 being arranged on the downstream side of the filter portion 12. The passage 11a is formed to be bent such that the angle θ between the opening face of the outside-air introducing port 11b and the upstream surface of the filter portion 12 is the obtuse angle. The case 11 has the guide portion 11f, the guide portion 11f being configured to rectify the part of the air on the upstream side of the filter portion 12 in the passage 11a such that the air is directed towards the vehicle front side, and the guide portion 11f being configured to guide the air to the filter portion 12.

According to the air-conditioning device 100 as described above, since the part of the air on the upstream side of the filter portion 12 is rectified by the guide portion 11f such that the air is directed towards the vehicle front side, the air is guided to the filter portion 12 with ease. Therefore, the deviation of the flow of the air in the passage 11a can be corrected by the guide portion 11f, and thus, it is possible to perform the air-conditioning with a high efficiency by reducing the passage resistance, and at the same time, it is possible to suppress the noise during the air-conditioning.

In addition, in the air-conditioning device 100, the case 11 has the first inside-air introducing port 11d and the second inside-air introducing port 11e between the outside-air introducing port 11b and the filter portion 12, the first inside-air introducing port 11d and the second inside-air introducing port 11e being capable of introducing the air from inside the vehicle cabin 3. The first inside-air introducing port 11d opens on the vehicle front side relative to the guide portion 11f, and the second inside-air introducing port 11e opens on the vehicle rear side relative to the guide portion 11f.

According to the air-conditioning device 100 as described above, since the air can be introduced into the passage 11a from inside the vehicle cabin 3 through two openings (the first inside-air introducing port 11d, the second inside-air introducing port 11e), it becomes easier to ensure the opening area, and it is possible to reduce a suction noise.

In addition, in the air-conditioning device 100, the guide portion 11f is configured such that the upstream-side end portion 11f1 is positioned on the outside-air introducing port 11b side relative to the opening lower end 11d1 of the first inside-air introducing port 11d and such that the downstream-side end portion 11f2 is in close proximity to the upstream surface of the filter portion 12.

According to the air-conditioning device 100 as described above, since the passage 11a is divided and the flow of the air is restricted by the guide portion 11f, it is possible to allow the air that has been divided by the guide portion 11f to flow towards the filter portion 12 without being joined with each other or being reversed to the passage on the other side.

In addition, the air-conditioning device 100 is further provided with the first inside-air introducing door 13 capable of blocking the air introduced from the first inside-air introducing port 11d into the passage 11a. The first inside-air introducing door 13 is the flap door pivotably supported at its upstream side, and when the air is introduced from inside the vehicle cabin 3 via the first inside-air introducing port 11d, the door tip end of the first inside-air introducing door is positioned between the position at which the first inside-air introducing port 11d is blocked and the upstream side of the guide portion 11f.

According to the air-conditioning device 100 as described above, since the door tip end of the first inside-air introducing door 13 is positioned between the position at which the inside-air introducing port 11d is blocked and the upstream side of the guide portion 11f, it is possible to mix the air from the outside-air introducing port 11b and the air from the inside-air introducing port 11d at an arbitrary ratio. In addition, in a case in which the door tip end is in close proximity to the upstream side of the guide portion 11f, it is possible to suppress the flow of the air from the outside-air introducing port 11b towards the downstream side of the passage 11a over the first inside-air introducing door 13. In addition, since the air introduced from the first inside-air introducing port 11d into the passage 11a can be guided to the filter portion 12 by the first inside-air introducing door 13 and the guide portion 11f, it is possible to reduce the deviation of the flow of the air in the passage 11a.

In addition, the air-conditioning device 100 is further provided with the second inside-air introducing door 14 capable of blocking the air introduced from the second inside-air introducing port 11e into the passage 11a. The second inside-air introducing door 14 is the flap door pivotably supported at its upstream side by being provided on the vehicle rear side of the passage 11a, and when the air is introduced from inside the vehicle cabin 3 via the second inside-air introducing port 11e, the door tip end of the second inside-air introducing door is positioned between the position at which the second inside-air introducing port 11e is blocked and the downstream side of the guide portion 11f.

According to the air-conditioning device 100 as described above, since the door tip end of the second inside-air introducing door 14 is positioned between the position at which the inside-air introducing port 11e is blocked and the downstream side of the guide portion 11f, it is possible to mix the air from the outside-air introducing port 11b and the air from the inside-air introducing port 11e at an arbitrary ratio. In addition, when the door tip end is in close proximity to the downstream side of the guide portion 11f, it is possible to suppress the flow of the air from the outside-air introducing port 11b towards the downstream side of the passage 11a over the second inside-air introducing door 14. In addition, since the air introduced from the second inside-air introducing port 11e into the passage 11a can be guided to the filter portion 12 by the second inside-air introducing door 14 and the guide portion 11f, it is possible to reduce the deviation of the flow of the air in the passage 11a.

In addition, in the air-conditioning device 100, when the mode is the outside-air introducing mode in which the air outside the vehicle 1 is introduced into the passage 11a, the first inside-air introducing door 13 is configured to block the passage of the air introduced from the first inside-air introducing port 11d to the passage 11a, and the second inside-air introducing door 14 is configured to block the passage of the air introduced from the second inside-air introducing port 11e to the passage 11a.

According to the air-conditioning device 100 as described above, since the flow of the air from inside the vehicle cabin 3 can be blocked by the first inside-air introducing door 13 and the second inside-air introducing door 14, and since only the air outside the vehicle 1 can be introduced into the passage 11a via the outside-air introducing port 11b, it is possible to suitably perform the air-conditioning in the outside-air introducing mode in which the inside of the vehicle cabin 3 is ventilated.

In addition, in the air-conditioning device 100, when the mode is the inside-air circulating mode in which the air in the vehicle cabin 3 is introduced into the passage 11a, the first inside-air introducing door 13 and the second inside-air introducing door 14 are configured to block the passage of the air introduced from the outside-air introducing port 11b through the passage 11a.

According to the air-conditioning device 100 as described above, since the flow of the air from outside the vehicle 1 can be blocked, and since only the air from inside the vehicle cabin 3 can be introduced to the passage 11a via the first inside-air introducing port 11d and the second inside-air introducing port 11e, it is possible to suitably perform the air-conditioning in an inside circulating mode in which the air that has been subjected to the air-conditioning is used again.

In addition, in the air-conditioning device 100, when the mode is the partial re-circulating mode in which the air outside the vehicle 1 (the outside air) and the air in the vehicle cabin 3 are introduced into the passage 11a, one of the first inside-air introducing door 13 and the second inside-air introducing door 14 restricts or blocks the passage of the air introduced from the outside-air introducing port 11b through the passage 11a, and the other of the first inside-air introducing door 13 and the second inside-air introducing door 14 blocks the passage of the air introduced from the first inside-air introducing port 11d or the second inside-air introducing port 11e through the passage 11a.

According to the air-conditioning device 100 as described above, the passage, in which only the outside air passes through, and the passage, in which only the air from inside the vehicle cabin 3 passes through or in which the air formed by mixing the inside air and the outside air at an arbitrary ratio passes through, are respectively formed in the passage 11a by the guide portion 11f, the first inside-air introducing door 13 and the second inside-air introducing door 14. Therefore, it is possible to suitably perform the air-conditioning in the partial re-circulating mode in which the air that has been subjected to the air-conditioning is used again while performing the ventilation by taking in the outside air.

In addition, in the air-conditioning device 100, when the mode is the partial re-circulating mode, the first inside-air introducing door 13 restricts or blocks the passage of the air introduced from the outside-air introducing port 11b through the passage 11a, and the second inside-air introducing door 14 blocks the passage of the air introduced from the second inside-air introducing port 11e through the passage 11a.

According to the air-conditioning device 100 as described above, the air in the vehicle cabin 3 is taken in via the first inside-air introducing port 11d from the vehicle front side that is in distant from the vehicle cabin 3, and similarly, the air outside the vehicle 1 is taken in via the outside-air introducing port 11b from the vehicle front side that is in distant from the vehicle cabin 3. Therefore, since the air can be taken in from the position away from the vehicle cabin 3 into the passage 11a when the air is taken in, the transmission of the noise to the vehicle cabin 3 can be suppressed, and therefore, it is possible to keep the silent environment in the vehicle cabin 3 at a high level.

In addition, in the air-conditioning device 100, the first inside-air introducing port 11d is arrange at the outside region of the perpendicular surface region, the perpendicular surface region extending perpendicularly from the upstream surface of the filter portion 12. The guide portion 11f is configured to guide the air introduced into the passage 11a from the first inside-air introducing port 11d to the filter portion 12.

According to the air-conditioning device 100 as described above, similarly to the flow of the air introduced from the outside-air introducing port 11b, the flow direction of the flow of the air introduced from the first inside-air introducing port 11d is also changed in the passage 11a abruptly. However, since the air introduced from the first inside-air introducing port 11d can be guided to the filter portion 12 by the guide portion 11f, it is possible to reduce the deviation of the flow of the air.

Although the embodiment of the present invention has been described in the above, the above-described embodiment merely illustrates a part of application examples of the present invention, and the technical scope of the present invention is not intended to be limited to the specific configurations of the above-described embodiment.

For example, in the air-conditioning device 100 described above, although the upstream-side end portion 11f1 of the guide portion 11f is arranged at the position in close proximity to the door tip end of the first inside-air introducing door 13 at the open position, the upstream-side end portion 11f1 may be extended along the passage 11a so as to approach the opening face of the outside-air introducing port 11b. In this case, the door tip end of the first inside-air introducing door 13 at the open position can block

The invention claimed is:

1. A vehicle air-conditioning device comprising:
a case inside of which a passage for air is formed, the case having an outside-air introducing port, a first inside-air introducing port, a second inside-air introducing port, and an air discharge port, the outside-air introducing port opening on a vehicle front side and being capable of introducing air from outside a vehicle, the first inside-air introducing port and the second inside-air introducing port being capable of introducing air from inside a vehicle cabin, and the air discharge port being capable of discharging the introduced air to an engine compartment side on the vehicle front side, the engine compartment side being on substantially a same side as the outside-air introducing port;
a filter portion inside of which the air can pass through, the filter portion being arranged on an upstream side of the air discharge port and on a downstream side of the outside-air introducing port and the inside-air introducing port; and an air blower capable of sucking the air introduced into the passage, the air blower being arranged on a downstream side of the filter portion and on the engine compartment side on the vehicle front side; wherein the first inside-air introducing port and the second inside-air introducing port are provided between the outside-air introducing port and the filter portion, the passage is formed to be bent such that an angle between an opening face of the outside-air introducing port and an upstream surface of the filter portion is an obtuse angle, the case has a guide portion, the guide portion being configured to rectify a part of the air on an upstream side of the filter portion in the passage such that the air is directed toward the vehicle front side, and the guide portion being configured to guide the air to the filter portion, the first inside-air introducing port opens on the vehicle front side relative to the guide portion, and the second inside-air introducing port opens on a vehicle rear side relative to the guide portion.

2. The vehicle air-conditioning device according to claim 1, wherein the guide portion is configured that an upstream-side end portion is positioned on the outside-air introducing port side relative to an opening lower end of the first inside-air introducing port and that a downstream-side end portion is in close proximity to the upstream surface of the filter portion.

3. The vehicle air-conditioning device according to claim 1, further comprising a first inside-air introducing door capable of blocking the air introduced from the first inside-air introducing port into the passage, wherein the first inside-air introducing door is a flap door pivotably supported at its upstream side, and when the air is introduced from inside the vehicle cabin via the first inside-air introducing port, a door tip end of the first inside-air introducing door being positioned between a position at which the first inside-air introducing port is blocked and an upstream side of the guide portion.

4. The vehicle air-conditioning device according to claim 3, further comprising a second inside-air introducing door capable of blocking the air introduced from the second inside-air introducing port into the passage, wherein the second inside-air introducing door is a flap door pivotably supported at its upstream side by being provided on a vehicle rear side of the passage, and when the air is introduced from inside the vehicle cabin via the second inside-air introducing port, the door tip end of the second inside-air introducing door being positioned between a position at which the second inside-air introducing port is blocked and a downstream side of the guide portion.

5. The vehicle air-conditioning device according to claim 4, wherein when a mode is an outside-air introducing mode in which the air outside the vehicle is introduced into the passage, the first inside-air introducing door is configured to block passage of the air introduced from the first inside-air introducing port through the passage, and the second inside-air introducing door is configured to block passage of the air introduced from the second inside-air introducing port through the passage.

6. The vehicle air-conditioning device according to claim 4, wherein when a mode is an inside-air circulating mode in which the air inside the vehicle cabin is introduced into the passage, the first inside-air introducing door and the second inside-air introducing door are configured to block passage of the air introduced from the outside-air introducing port through the passage.

7. The vehicle air-conditioning device according claim 4, wherein when a mode is a partial re-circulating mode in which the air outside the vehicle and the air inside the vehicle cabin are introduced into the passage, one of the first inside-air introducing door and the second inside-air introducing door restricts or blocks passage of the air introduced from the outside-air introducing port through the passage, and other of the first inside-air introducing door and the second inside-air introducing door blocks passage of the air introduced from the first inside-air introducing port or the second inside-air introducing port through the passage.

8. The vehicle air-conditioning device according to claim 7, wherein when a mode is the partial re-circulating mode, the first inside-air introducing door restricts or blocks passage of the air introduced from the outside-air introducing port through the passage, and the second inside-air introducing door blocks passage of the air introduced from the second inside-air introducing port through the passage.

9. The vehicle air-conditioning device according to claim 1, wherein the first inside-air introducing port is arranged at an outside region of a perpendicular surface region extending perpendicularly from the upstream surface of the filter portion, and the guide portion is configured to guide the air introduced into the passage from the first inside-air introducing port to the filter portion.

* * * * *